No. 625,650. Patented May 23, 1899.
W. G. DAY & T. A. BRYAN.
PROCESS OF IMPROVING ALCOHOLIC LIQUIDS.
(Application filed Mar. 19, 1898.)
(No Model.)
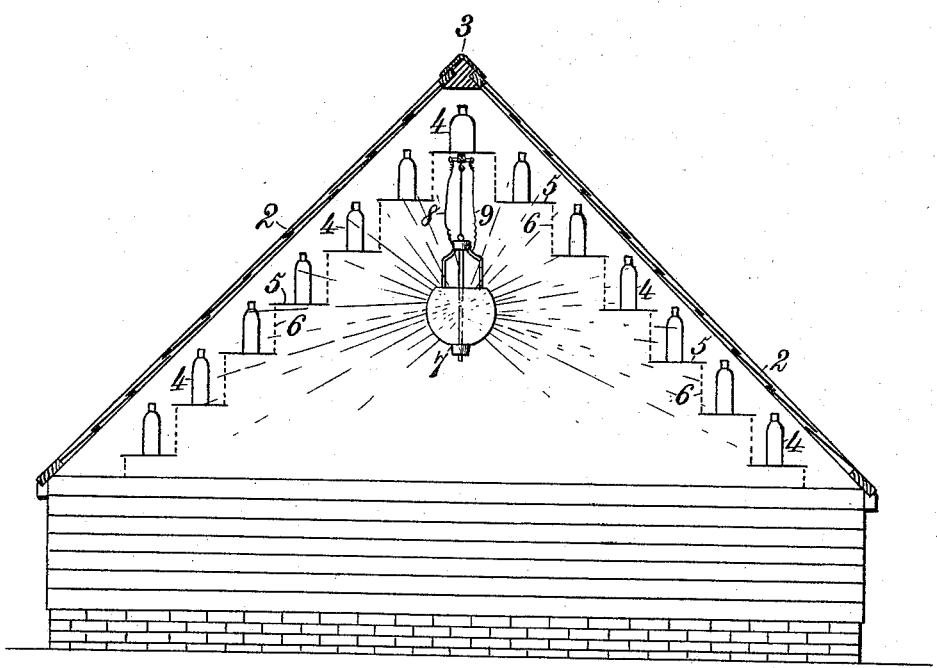
Witnesses.
Robert Everett
Dennis Sumby
Inventors.
Willard G. Day,
Thomas A. Bryan,
By James L. Norris
Atty.

UNITED STATES PATENT OFFICE.

WILLARD GIBSON DAY AND THOMAS A. BRYAN, OF BALTIMORE, MARYLAND, ASSIGNORS, BY DIRECT AND MESNE ASSIGNMENTS, OF ONE-HALF TO CHARLES H. BOONE, OF SAME PLACE.

PROCESS OF IMPROVING ALCOHOLIC LIQUIDS.

SPECIFICATION forming part of Letters Patent No. 625,650, dated May 23, 1899.

Application filed March 19, 1898. Serial No. 673,959. (No specimens.)

*To all whom it may concern:*

Be it known that we, WILLARD GIBSON DAY and THOMAS A. BRYAN, citizens of the United States, residing at Baltimore city, State of Maryland, have invented new and useful Improvements in Processes of Improving Alcoholic Liquids, of which the following is a specification.

This invention relates to the treatment of newly-distilled whisky and other alcoholic liquors containing mixtures of homologous alcohols, as in the case of brandy, wine, cordials, and like alcoholic beverages.

The object of our invention is to improve the taste or flavor and the physiological characteristics of whisky and other alcoholic liquors.

To accomplish this object, our invention consists in the addition of a proper proportion of purified methyl alcohol to distilled alcoholic liquor and subjecting the liquor to the influence of actinic rays of light.

In order to enable those skilled in the art to practice our invention, we will describe the same in detail with reference to the accompanying drawing, which is a vertical sectional view of an apparatus suitable for the purpose in hand.

We have discovered that by the addition in proper proportion of methyl alcohol to alcoholic liquors—such as whisky, wine, &c.—and subjecting the same to the influence of the actinic rays of sufficiently powerful light the percentage of the constituent fusel-oil or other oils of the higher series of alcohol is diminished or dissipated and the latter improved in taste, in flavor, and in its physiological characteristics. It has a milder and richer taste or flavor, its intoxicating effect is materially reduced, and it is rendered more suitable as medicine.

In practicing our invention the fusel-oil in the liquor to be improved is first ascertained by methods well known to those skilled in the art of rectifying, and then the methyl alcohol is added in the proportion of three molecules of methyl to one molecule of amyl alcohol or, by weight, ninety-six parts of methyl to eighty-eight parts of amyl alcohol, and the liquor, with the added methyl alcohol, is then exposed to the influence of the actinic rays of powerful light—as, for instance, the actinic rays of electric light or sunlight.

In carrying our invention into practice we prefer to employ the simple apparatus illustrated by the accompanying drawing. This apparatus consists of a glass building, somewhat resembling an ordinary greenhouse, preferably square, with the glass roof 2 sloping upward to the apex 3. In this glass structure, directly under the sloping sides of the glass roof, is placed shelving, arranged in steps to support the glass bottles or vessels 4 containing the liquor and constructed of such material as will readily permit the free passage of the rays of light in all directions. The horizontal portions 5 of the stepped shelving are preferably plates of glass and the risers or vertical parts 6 open wire or other work. The shelving is preferaly arranged to follow the general contour of the glass roof, and in the center is arranged an electric lamp 7, suitably connected by conductors 8 and 9 with an electric generator, whereby sufficiently powerful light for the purpose in hand is obtained. It is possible to employ acetylene gas for the purpose of producing the sufficiently powerful light; but an electric lamp in which electric energy is generated is preferable in that the waves of radiant energy may be brought to the required strength and activity.

The purpose of the glass structure is to enable us to utilize sunlight as an auxiliary or aid to the electric light in daytime, whereby the process of changing the alcohol molecules is expedited.

We have found that a sufficiently powerful light is obtained from an incandescent lamp of fifty-candle power when placed near or within three inches of the bottle or vessel containing the liquor.

After the liquor has been exposed a sufficient length of time to the action of the waves of radiant energy, the period extending from one to six weeks, depending largely on the power of the light and the number of hours it is employed during each day, the liquor is filtered to remove the precipitated impurities.

It is desirable and important to preserve the liquor from undue heating during the practice of our invention; otherwise the methyl alcohol, which has a low boiling-point, might be evaporated. According to our invention the liquor is not perceptibly heated, it is not redistilled, it is practically not affected by undue heat from the light, and our process may be carried into effect in a freezing temperature.

The addition to distilled whisky, brandy, wine, cordials, and like alcoholic beverages of a proper proportion of methyl alcohol and the exposure of the liquor with the added methyl alcohol to the actinic rays of sufficiently powerful light, as herein described, we have found affects the liquor and improves its taste, flavor, and physiological characteristics, making it milder and richer in taste or flavor, materially reducing its intoxicating characteristics, and rendering it more suitable for use as a medicine.

Having thus described our invention, what we claim is—

1. The process or method herein described of improving alcoholic liquor, which consists in adding methyl alcohol to the liquor, and subsequently subjecting the latter to the influence of light, substantially as set forth.

2. The process or method herein described of improving alcoholic liquor, which consists in adding methyl alcohol to the liquor, and subsequently subjecting the latter to the influence of waves of radiant energy developed by an electric lamp, substantially as set forth.

3. The method or process herein described of improving alcoholic liquor, which consists in adding purified methyl alcohol to the liquor, placing the liquor in a vessel through which rays of light can freely pass, and subjecting the vessel and the liquor therein contained, to the influence of the actinic rays of light, substantially as set forth.

4. The process or method herein described of improving alcoholic liquor, which consists in adding methyl alcohol to the liquor and subjecting the same to the influence of the actinic rays of light, substantially as set forth.

In testimony whereof we have hereunto set our hands in presence of two subscribing witnesses.

WILLARD GIBSON DAY.
THOMAS A. BRYAN.

Witnesses:
M. J. SIMSON,
SAML. L. FISHER.